United States Patent [19]

Furuta et al.

[11] Patent Number: 4,627,332
[45] Date of Patent: Dec. 9, 1986

[54] SEALING MEMBERS FOR MASTER CYLINDERS

[75] Inventors: Youichi Furuta; Chiaki Ochiai, both of Chiryu, Japan

[73] Assignee: Aisin Seiki Kabushiki Kaisha, Japan

[21] Appl. No.: 578,692

[22] Filed: Feb. 9, 1984

[30] Foreign Application Priority Data

Mar. 31, 1983 [JP] Japan ............... 58-45794[U]

[51] Int. Cl.$^4$ .................................. F16J 15/18
[52] U.S. Cl. ........................ 92/168; 60/533; 277/58; 277/70; 277/205; 277/207 R
[58] Field of Search ............ 60/594, 533; 92/168; 277/58, 70, 205, 207 R

[56] References Cited

U.S. PATENT DOCUMENTS

| | | | |
|---|---|---|---|
| 2,284,340 | 5/1942 | Nuckles | 92/168 |
| 2,985,140 | 5/1961 | Fagge | 92/168 |
| 3,037,781 | 6/1962 | Péras | 277/182 |
| 3,411,414 | 11/1968 | Brown | 92/168 |
| 3,465,650 | 9/1969 | Gluck | 92/168 |
| 3,841,204 | 10/1974 | Bennett | 277/58 |
| 3,913,460 | 10/1975 | Wright | 277/205 |
| 4,060,023 | 11/1977 | Vegella | 92/168 |
| 4,111,441 | 9/1978 | Sick et al. | 277/183 |
| 4,196,912 | 4/1980 | Quitberg | 277/205 |
| 4,398,731 | 8/1983 | Gorman | 277/207 R |
| 4,423,666 | 1/1984 | Ohmi | 92/168 |

OTHER PUBLICATIONS

Pages from German Catalogue dated Aug. 1974.

*Primary Examiner*—Abraham Hershkovitz
*Attorney, Agent, or Firm*—Finnegan, Henderson, Farabow, Garrett & Dunner

[57] ABSTRACT

A sealing member for a master cylinder including outer and inner annular lip portions formed integrally on an annular base portion and an annular rib portion having a length greater than the lip portions.

2 Claims, 2 Drawing Figures

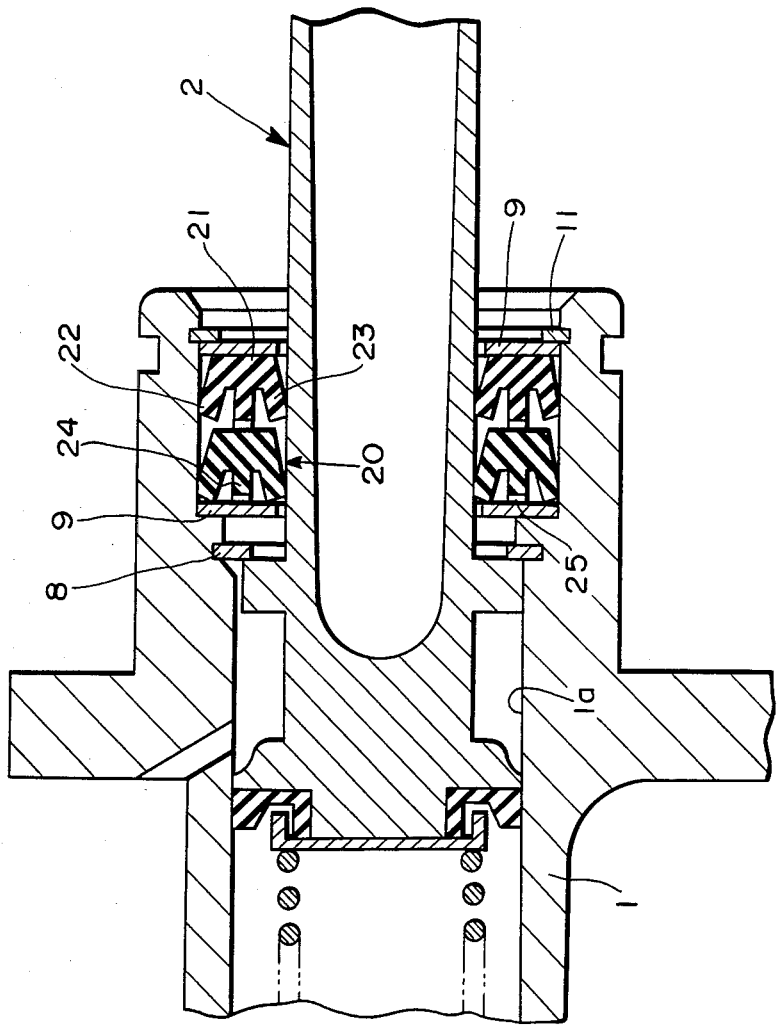

SEALING MEMBERS FOR MASTER CYLINDERS

BACKGROUND OF THE INVENTION

This invention relates to sealing members for master cylinders.

A typical conventional sealing member for use with a master cylinder will first be described with reference to FIG. 1 of the drawings.

The master cylinder shown in FIG. 1 is designed to be installed in a brake booster for a road vehicle and comprises a cylinder body 1 provided with a stepped inner bore 1a having an open rear end (right-hand end as viewed in FIG. 1), first and second pistons 2 and 3 axially slidably supported within the bore 1a by means of cup seals A, B and C, and springs 4 and 5 for urging the pistons 2 and 3, respectively, rearwardly or rightwardly. The master cylinder further arranged so that the rightward axial movement of the first piston 2 is limited by engaging a head or larger diameter portion 2a thereof with an annular stop 6 fixed to an inner stepped portion 1b of the cylinder body 1, thereby determining its initial or rest position. First piston 2 includes a shank or smaller diameter portion 2b outwardly extending through sealing members 7, 7 located within the inner bore 1a and rearward of the stop 6.

The stop 6 is retained by a clip 8 detachably fitted within an annular groove 1c formed in the inner wall surface of the cylinder body 1, and the sealing members 7, 7 together with a pair of annular retaining plates 9, 9 and a corrugated spacer 10 are also held by a further clip 11 fitted within an annular groove 1d formed in the inner wall surface of the cylinder body 1. The space 10 has on its opposite surfaces a plurality of radially extending crests and troughs in alternate disposition, and cylinder body 1 also has a small radial hole 1e formed in its wall, so that if there is a leakage of hydraulic braking fluid through a clearance between the smaller diameter portion 2b of the piston 2 and the forward or leftward sealing member 7, it might be discharged through the forward troughs of the spacer 10 and the hole 1e of the cylinder body 1 to the exterior.

As seen in FIG. 1, the forward sealing member 7 is contacted at its base portion 7a with the forwardly protruding crests of the corrugated spacer 10, and the rearward or rightward sealing member 7 is contacted at its outer and inner annular lip portions 7b and 7c with the rearwardly protruding crests of the spacer 10. Thus, when the forward sealing member receives the hydraulic fluid pressure in the rightward direction, the base portion 7a of thereof will tend to be intruded into the forward troughs of the spacer 10, thereby causing a risk of reducing the contact pressure of the lip portions 7b and 7c of the forward sealing member 7 to the associated surfaces of the cylinder body 1 and the piston 2 and further resulting in that the rearward crests of the spacer 10 tend to separate the lip portions 7b and 7c of the rearward sealing member 7 from the associated surfaces of the cylinder body 1 and the piston 2 to lower the sealing ability. In addition, there are further drawbacks that the corrugated spacer has to be provided between the forward and rearward sealing members and the assembly requires much time and cost.

The present invention has for its object to remove the risks and drawbacks of the conventional sealing members described above.

The present invention basically utilizes a technical measure that an axially extending annular rib portion is integrally provided on the sealing member between outer and inner lip portions, the rib being formed with a plurality of radial slots which are, preferably, equi-angularly spaced from one another, and the rib portion at its free end being in abutting engagement with a rear surface of a base portion of an adjacent or forward sealing member, thereby bringing fourth the effect of appropriately positioning the sealing members, easily assembling the cylinder with a reduced number of parts and requiring no corrugaged spacer.

BRIEF DESCRIPTION OF THE DRAWINGS

FIG. 2 is a fragmentary longitudinal section of a master cylinder having sealing members in accordance with the present invention.

DESCRIPTION OF THE PREFERRED EMBODIMENT

Figure 1:
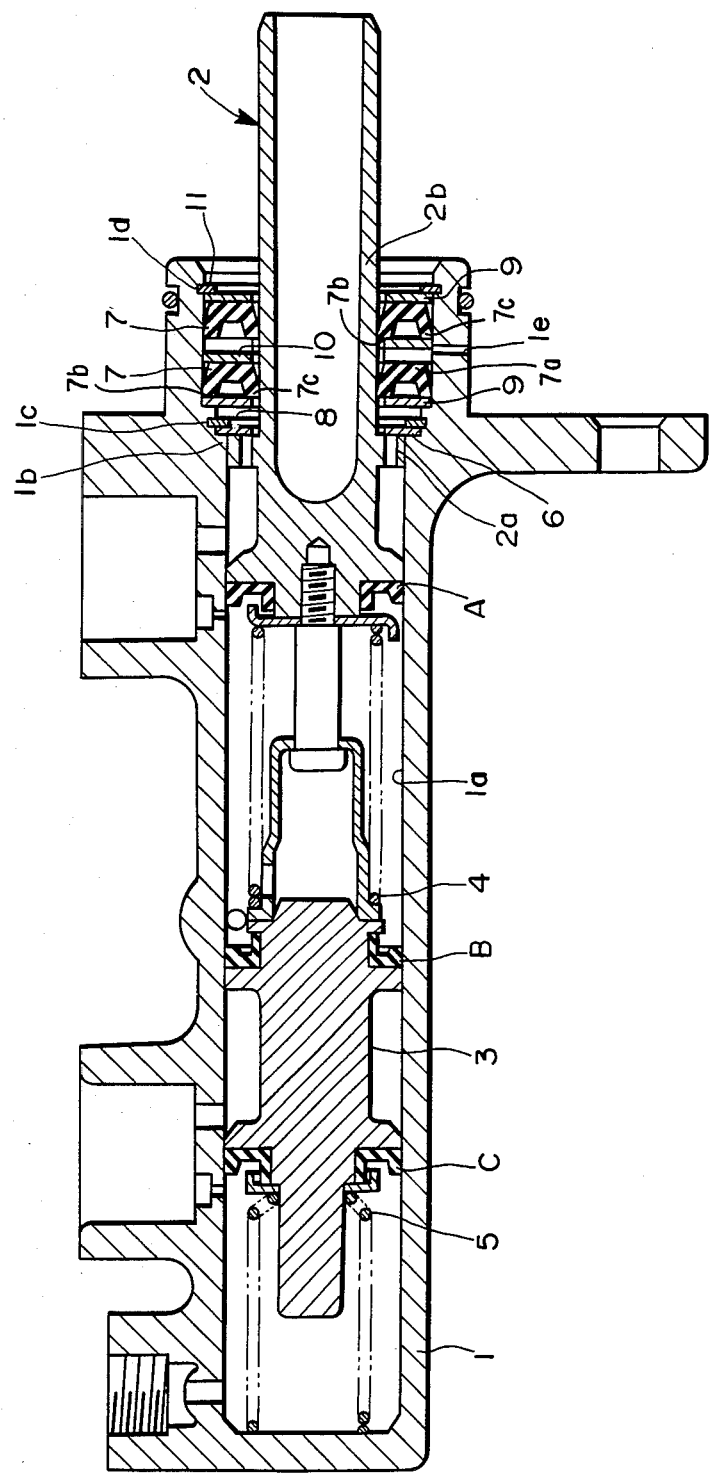
FIG. 1 is a longitudinal sectional view of a master cylinder having typical conventional sealing members.

Referring to FIG. 2, there is shown a master cylinder which can be used for the same purpose as the master cylinder shown in FIG. 1 and described above, and parts similar to those of the cylinder of FIG. 1 are designated by the same reference numerals.

The cylinder has a pair of sealing members 20 constructed in accordance with the present invention. Each of the sealing members 20 has an annular base portion 21, an outer annular lip portion 22 which is in sealing engagement with the larger diameter wall surface of the bore 1a of the body 1, an inner annular lip portion 23 which is in sealing and sliding contact with the outer periphery of the piston 2 and a rib portion 24 which is formed integrally with the base portion 21 and axially extends therefrom between the outer and inner lip portions 22 and 23 in the same axial direction. Furthermore, the rib portion 24 is axially longer than lip portions 22, 23, so that the free end portion of the rib portion 24 protrudes from a plane passing on the free ends of the lip portions 22, 23. The free end portion of the rib portion 24 has a plurality of radial slots 25, preferably four slots which are equi-angularly spaced from one another. The slots 25 serve to establish the fluid communication between the outer and inner lip portions 22 and 23 to uniformly distribute the operating oil or lubricant around the outer and inner peripheries of the sealing member.

Two of such sealing members 20 are located so that the free end of the rib portion 24 of the forward sealing member 20 abuts upon the forward retaining plate 9 secured to the stepped portion of the bore 1a, the free end of the rib portion 24 of the rearward sealing member 20 abutting upon the rear surface of the base portion 21 of the forward sealing member 20, and the base portion 21 of the rearward sealing member 20 being held against axially rearward movement by the rearward retaining plate 9 retained by the clip 11. It will be appreciated that both the sealing members are axially oriented so that their lip portions and rib portions extend towards the cylinder chamber having a higher fluid pressure. It is further noted that the radial length of the rib portion 25 of the sealing member can appropriately be determined taking the distance between the outer and inner lip portions 22 and 23 into consideration.

We claim:

1. An annular sealing member assembly to be disposed in an annular space defined by the inner wall of a cylindrical bore, the outer wall of an operating piston axially movable in said bore, and a pair fixed, axially-spaced annular surfaces, said assembly comprising at least two sealing members, each said sealing member including an annular base portion, an outer annular lip portion integrally formed on said base portion for sealing engagement with said inner wall, an inner annular lip portion integrally formed on said base portion for sliding and sealing contact with said outer wall, and an annular rib portion integrally formed on said base portion radially between said lip portions, said rib portion axially extending in the same direction as and for a distance greater than said lip portions and having a plurality of radially-extending slots permitting uniform distribution of fluid between the peripheries of said sealing member, wherein said sealing members in said assembly are axially abutting and so oriented that the base portion of one sealing member abuts one said annular surface, the base portion of the other sealing member abuts the end of the rib portion of said one sealing member, and the end of the rib portion of the other sealing member abuts the other annular surface.

2. The sealing member as in claim 1, wherein the rib portion of each said sealing member includes four said radial slots equi-angularly spaced from one another.

* * * * *